US011764355B2

United States Patent
Liu et al.

(10) Patent No.: US 11,764,355 B2
(45) Date of Patent: Sep. 19, 2023

(54) CATHODE ACTIVE MATERIALS FOR SECONDARY BATTERIES

(71) Applicant: UChicago Argonne, LLC, Chicago, IL (US)

(72) Inventors: Tongchao Liu, Westmont, IL (US); Jun Lu, Naperville, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 495 days.

(21) Appl. No.: 16/749,239

(22) Filed: Jan. 22, 2020

(65) Prior Publication Data

US 2021/0226203 A1    Jul. 22, 2021

(51) Int. Cl.
    *H01M 4/505*     (2010.01)
    *H01M 10/0525*     (2010.01)
    *C01G 53/00*     (2006.01)
    *H01M 4/525*     (2010.01)
    *H01M 4/02*     (2006.01)

(52) U.S. Cl.
    CPC ............ *H01M 4/505* (2013.01); *C01G 53/50* (2013.01); *C01G 53/66* (2013.01); *H01M 4/525* (2013.01); *H01M 10/0525* (2013.01); *C01P 2002/52* (2013.01); *C01P 2002/85* (2013.01); *C01P 2004/03* (2013.01); *C01P 2004/04* (2013.01); *C01P 2004/32* (2013.01); *C01P 2004/61* (2013.01); *C01P 2004/64* (2013.01); *C01P 2006/40* (2013.01); *H01M 2004/021* (2013.01); *H01M 2004/028* (2013.01)

(58) Field of Classification Search
    CPC .... H01M 4/525; H01M 4/505; H01M 10/525; H01M 2004/021; H01M 2004/028; H01M 10/0525; C01G 53/66; C01G 53/50; C01P 2002/52; C01P 2002/85; C01P 2004/04; C01P 2004/61; C01P 2004/32; C01P 2004/03; C01P 2004/64; C01P 2006/40
    USPC ...................................................... 429/231.3
    See application file for complete search history.

(56) References Cited

U.S. PATENT DOCUMENTS

| | | | |
|---|---|---|---|
| 6,395,250 B2 | 5/2002 | Matsubara et al. | |
| 7,381,498 B2 | 6/2008 | Suhara et al. | |
| 8,658,125 B2 | 2/2014 | Ohzuku et al. | |
| 9,318,739 B2 | 4/2016 | Toya et al. | |
| 2003/0134200 A1 | 7/2003 | Tanaka et al. | |
| 2004/0091779 A1* | 5/2004 | Kang | C01G 53/50 429/223 |
| 2008/0102369 A1* | 5/2008 | Sakata | H01M 10/4235 429/188 |
| 2011/0244331 A1* | 10/2011 | Karthikeyan | H01M 4/525 429/223 |
| 2017/0200944 A1* | 7/2017 | Hwang | H01M 10/0567 |
| 2020/0373574 A1* | 11/2020 | Kokubu | H01M 4/623 |
| 2022/0190316 A1* | 6/2022 | Seo | H01M 4/1391 |

FOREIGN PATENT DOCUMENTS

| | | | | |
|---|---|---|---|---|
| CN | 103280576 | * | 9/2013 | ............ H01M 4/485 |
| EP | 2 557 068 B1 | | 8/2014 | |
| JP | 2003-168430 A | | 6/2003 | |
| JP | 4752244 B2 | | 8/2011 | |
| WO | WO 2019/097951 | * | 5/2019 | ............ H01M 4/525 |
| WO | WO 2020134048 | * | 7/2019 | ........ H01M 10/0525 |

OTHER PUBLICATIONS

English Machine translation CN 103280576 ESPACENET Sep. 4, 2013.*
English Machine translation Abstract CN 103280576 ESPACENET Sep. 4, 2013.*
X. Zhang [X.Zhang] (Dissertation Abstract Jan. 1, 2011).*
X. Zhang Dissertation Abstract Jan. 1, 2011 Aerosol SY.nthesis of Cathode Materials for Li-Ion Batteries {(httRs://oRenscholarshiR,wustl.edu/cgi/viewcontent.QQi1article= 1673&context=etd).}.*
Cobalt-Free Lithium-rich Ternary Positive Electrode Active Material NMA and Preparation Method Thereof, by Zhao Chunyang et al. in WO2020134048 English language machine translation (Year: 2020).*

* cited by examiner

*Primary Examiner* — Cynthia H Kelly
*Assistant Examiner* — Omar M Kekia
(74) *Attorney, Agent, or Firm* — Foley & Lardner LLP

(57) ABSTRACT

A cathode active material of formula $LiNi_xMn_yAl_zM_\alpha O_{2-\epsilon}B_\epsilon$ or $NaNi_{x'}Mn_{y'}Al_{z'}M'_{\alpha'}O_{2-\epsilon'}B_{\epsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq0.2$, $0\leq\alpha\leq0.2$, $0\leq\epsilon\leq0.1$, $0.5<x'<1$, $0<y'<0.5$, $0<z'\leq0.2$, $0\leq\alpha'\leq0.2$, and $0\leq\epsilon'\leq0.1$. The particle is a single crystal, a single particle, or a secondary particle comprising a plurality of primary particles; and the particle is a uniform composition or a concentration gradient composition.

14 Claims, 11 Drawing Sheets

A point

| Element | AN | Series | Net orm at.% |
|---|---|---|---|
| Nickel | 28 | K-series | 75.2548 |
| Manganese | 25 | K-series | 19.4553 |
| Magnesium | 12 | K-series | 0.4264 |
| Aluminium | 13 | K-series | 4.1239 |
| Titanium | 22 | K-series | 0.7396 |

B point

| Element | AN | Series | Net orm at.% |
|---|---|---|---|
| Nickel | 28 | K-series | 76.1424 |
| Manganese | 25 | K-series | 18.9786 |
| Magnesium | 12 | K-series | 0.1425 |
| Aluminium | 13 | K-series | 4.6696 |
| Titanium | 22 | K-series | 0.0361 |

CATHODE ACTIVE MATERIALS FOR SECONDARY BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to cathode active materials for use in secondary battery. More specifically it is related to cathode active material for use in lithium-ion batteries or sodium-ion batteries, and methods of preparing the same, where the cathode active materials are free of cobalt.

BACKGROUND

The ever-rising mining royalties, specifically on cobalt ore, in the Democratic Republic of the Congo (DRC) has cast a lingering tension over the battery industry. The DRC produced over 65% of mined cobalt, globally, in 2017, while its mining industry has long been suffering from the ethical and political quandaries with a resultant unreliable supply chain. Cobalt is currently an essential ingredient in cathode active materials for lithium and sodium ion batteries. The predicament posed by cobalt production in the DRC has been further intensified surging battery production volumes in the electrical vehicle (EV) market, leading to soaring wholesale cobalt prices, and constraining the pace of transportation electrification. In response, the battery communities are scrambling to develop new electrode materials in order to disengage from the cobalt reliance.

Cobalt currently constitutes the most commercially popular cathodes (defined as Co-containing cathodes) such as $LiCoO_2$, $LiNi_xMn_yCo_{1-x-y}O_2$, and $LiNi_{0.8}Co_{0.15}Al_{0.05}O_2$. [See e.g., *Nature Energy* 2019, 4:594; *J. Electrochem. Soc.*, 1995, 142:4033; and U.S. Pat. No. 6,395,250]. These cathodes are widely applied in portable devices and electric vehicles. Therefore, reducing the cobalt content in cathode active materials has become a priority.

Nickel-rich, layered cathodes are currently considered as a feasible path to reduce cobalt usage, simultaneously achieving extremely high capacity and outstanding kinetic performance. For example, $LiNi_{0.8}Mn_{0.1}Co_{0.1}O_2$ has successfully reduced the required amount of cobalt to just 10%, while maintaining a high capacity of more than 200 mAh $g^{-1}$. [*Adv. Energy Mater.* 2019, 9: 201901597]. However, it is worth noting that even only 10% of cobalt still accounts for a high proportion of cost because of its extremely high price. Other possible alternative materials include spine $LiMn_2O_4$ and olivine $LiFePO_4$. [*J. Am. Chem. Soc.* 2016, 138:13326; and *Nat. Commun.* 2019, 10:4721]. Nevertheless, despite their advantages in safety and economical proficiency, the reversible capacity and stability remain far from satisfying in most applications.

SUMMARY

In one aspect, a cathode active material is provided, including $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq0.2$, $0\leq\alpha\leq0.2$, $0\leq\varepsilon\leq0.1$, $0.5<x'<1$, $0<y'<0.5$, $0<z'\leq0.2$, $0<\alpha'\leq0.2$, and $0\leq\varepsilon\leq0.1$. The cathode active material is cobalt-free. The morphology of the material may be described as being a single crystal, a single particle, or as a secondary particle with a plurality of primary particle structure, where the primary particles are small that the secondary particle that is a conglomeration of the primary particles. Further, the metal concentration within the particle may be uniform, core-shell, or a partial/full concentration gradient with one slope or more. As used herein, one slope or more indicates where the concentration varies along a radius in the particle at least at one rate, or as varying with multiple rates of change in the concentration.

In another aspect, a cathode active material represented as $\delta Li_2MnO_3 \cdot (1-\delta)LiQO_2$, wherein Q is a mixture of Mn, Al, Ti, and Mg, and may optionally include Ni, and $0<\delta<1$, where sum of the Al, Ti, and Mg content should be less than 10 mol %.

In another aspect, a method is provided to suppress Li/Ni disorder and improve electronic conductive by controlling Al, Ti, and Mg content. Other elements with similar functions may be introducing into the composition as dopant cation, wherein the dopant cation is an alkaline earth metal element or a transition metal element other than Ni, Co, Mn, and Al or combinations of any two or more thereof. The dopant may, in some embodiments, be Ca, Cr, V, Fe, Cu, Zn, Zr, Nb, Mo, Ru, Jr, La, W, Sn, Sb, or a mixture of any two or more thereof. The dopant cation may have a constant concentration across the whole particle or exist only at the surface of the particle (i.e., surface doping).

In another aspect, a surface protection method is provided for electrochemical devices containing the cathode active materials described above. In such embodiments, the surface protection method, may include a surface coating layer on the cathode active material. The surface coating layer materials may be selected from a conductive carbon coating, a polymer coating such as poly(3,4-ethylenedioxythiophene) ("PEDOT"), a metal oxide, a metal fluoride, a metal phosphate, or a combination of any two or more thereof.

In another aspect, a process is provided for preparing cathode active materials having a uniform, core-shell, or part/full concentration gradient composition. A used herein, a uniform composition refers to the transition metals in the whole particle are uniformly distributed. As used herein, a core-shell composition refers to the core composition of particle is different that the shell and there is a distinct boundary between the two. As used herein, a part/full concentration gradient composition refers to the core composition that partially or continuously changes in concentration into the shell composition without any distinct boundary. The process may be a co-precipitation reaction between metal salts in the presence of a precipitation agent in a specific solvent, followed by first and second (or more) calcination steps followed by a step of temperature cooling down of the reaction.

In another aspect, a process for preparing a cathode active material includes a solid state reaction, the process including mixing solid transition metal salts of Ni, Mn, Al and M and M' with appropriate ratio of a lithium or sodium salt to form a mixture; and calcining the mixture at a temperature of about 680° C. to about 1200° C., for a time period of about 5 hours to about 30 hours, in an atmosphere of oxygen, air, or oxygen-enriched air.

In another aspect, the present invention provides a method for preparing the cathode active materials, wherein the process may be a single particle growth method comprising: one-step or multiple steps (at least two-step).

In some embodiments, an electrochemical device comprising an anode, a non-aqueous electrolyte, and a cathode; the cathode including a cathode active material of formula $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq 0.2$, $0<\alpha\leq 0.2$, $0\leq\varepsilon\leq 0.1$, $0.5<x'<1$, $0<y'<0.5$, $0<z'\leq 0.2$, $0<\alpha'\leq 0.2$, and $0\leq\varepsilon'\leq 0.1$. The electrochemical device may be a lithium ion battery or sodium ion battery.

BRIEF DESCRIPTION OF THE DRAWINGS

As shown in FIG. 6, the uniform compositions of Ni, Mn, and Al have been confirmed with uniform color distributions.

DETAILED DESCRIPTION

Figure 1:
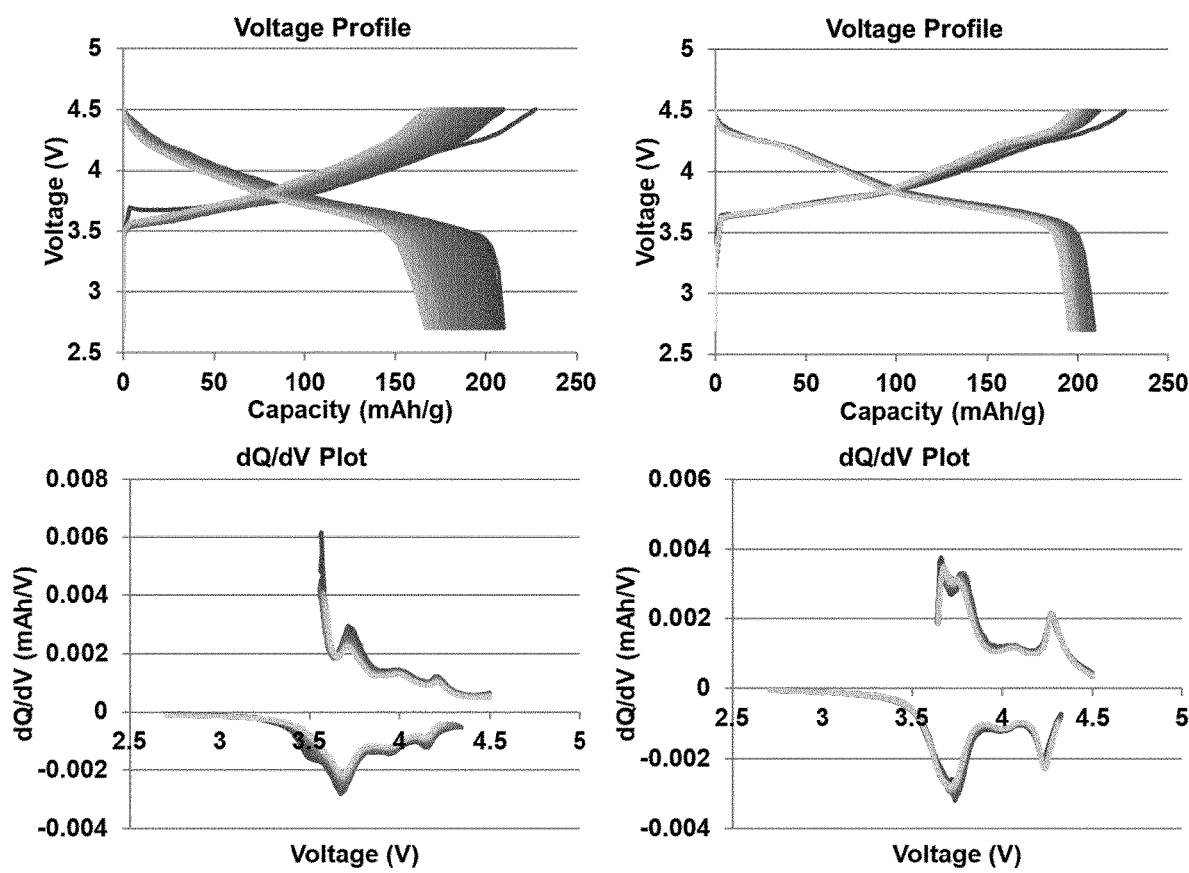
FIG. 1 illustrates a direct comparison of electrochemical performance for $LiNi_{0.8}Co_{0.2}O_2$ and $LiNi_{0.8}Mn_{0.2}O_2$ at a cut-off potential of 4.5 V. After 50 cycles, the capacity loss of NC82 is around 21% while that of NM82 is only 7.9%, which indicates that the Mn is more effective than Co for stabling Ni-rich cathode active materials.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In order to reduce cost and further improve performance of prior art layered oxide cathode active materials that contain cobalt, cathode active material compositions that are cobalt-free are provided herein for use in lithium or sodium ion batteries. These cobalt-free materials deliver competitive or superior electrochemical performance when compared to cobalt-containing counterpart materials. The cathode active materials may be single crystals, single particle materials, or composite materials having a secondary particle that is composed of smaller, primary particles. Also provided are methods/processes for preparing the new compositions of cathode active materials. Also provided are methods for preparing the cathode active materials with different composition structures, such as uniform compositions, full concentration gradient compositions, and core-shell structures. Finally, processes are described to suppress cation mixing (Li/Ni disorder), and further improve electrochemical performance of lithium ion batteries or sodium ion batteries that are cobalt-free.

As concentration changes are described herein, they may be step-wise or gradient. In step-wise, a concentration is established in the particle until a certain size reached, where the concentration is changed, such that a "step" along the vector radius can be observed. In gradient, the concentration is continually changing due to changes in concentration of the precursor materials as they are mixed, thus changes are referred to as continual, or two-slope, but are distinct from step-wise.

A cathode active material expressed as $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq 0.2$, $0\leq\alpha\leq 0.2$, $0\leq\varepsilon\leq 0.1$, $0.5<x'<1$, $0<y'<0.5$, $0<z'\leq 0.2$, $0\leq\alpha'\leq 0.2$, and $0\leq\varepsilon'\leq 0.1$ The cathode active material may have a morphology that is a secondary particle with primary particles or single particle. The cathode active material may have uniform composition or concentration gradient composition. When the cathode active material exhibits a uniform composition, $0 \leq \alpha \leq 0.2$, $0.8 < x < 1$, $0 < y < 0.2$, $0 < z \leq 0.2$, and $0 \leq \varepsilon \leq 0.1$; and $0 < \alpha' \leq 0.2$, $0.5 < x' < 1$, $0 < y' < 0.5$, $0 \leq \alpha' \leq 0.2$, $0 < z' \leq 0.2$, and $0 \leq \varepsilon' \leq 0.1$. When the cathode active material exhibits a concentration gradient, $0 \leq \alpha \leq 0.2$, $0.5 < x < 1$, $0 < y < 0.2$, $0 < z \leq 0.2$, and $0 \leq \varepsilon \leq 0.1$; and $0 \leq \alpha' \leq 0.2$, $0.5 < x' < 1$, $0 < y' < 0.5$, $0 < \alpha' \leq 0.1$, $0 < z' \leq 0.2$, and $0 \leq \varepsilon' \leq 0.1$. Any of the compositions herein may be cobalt-free. In some embodiments, the cathode active material has the formula $LiNi_xMn_yAl_zTi_jMg_kO_{2-\varepsilon}B_\varepsilon$, wherein $0 < z \leq 0.1$, $0 < j \leq 0.05$, $0 < k \leq 0.05$, and wherein the sum of z, j, and k is $\leq 0.2$. In further embodiments, $0 < z \leq 0.06$, $0 < j \leq 0.01$, and $0 < k \leq 0.01$. In some embodiments, the cathode active material has the formula $NaNi_xMn_yAl_zTi_jMg_kO_{2-\varepsilon'}B_{\varepsilon'}$, wherein $0 < z' \leq 0.1$, $0 < j' \leq 0.05$, $0 < k' \leq 0.05$, and wherein the sum of z', j', and k' is $\leq 0.2$. In further embodiments, $0 < z' \leq 0.06$, $0 < j' \leq 0.01$, and $0 < k' \leq 0.01$. In some embodiments, the cathode active material has formula $NaNi_xMn_yAl_zM'_{\alpha'}O_{2-\varepsilon'}B_{\varepsilon'}$, wherein M' is Ti, Mg, or a combination thereof; $0 \leq \alpha' \leq 0.1$, and wherein the sum of z' and $\alpha'$ is $\leq 0.2$.

The cathode active material may be characterized by a concentration that may be uniform, core-shell, or part/full concentration gradient, wherein the concentration of Ni may be constant or decreased from the particle center to surface, the concentration of Mn may be constant or decreased/increased from particle center to surface; the concentration of Al may be constant or increased from particle center to surface, the concentrations of M or M' may be constant or decreased/increased from particle center to surface. Where the concentration of any metals in the gradient cathode active material decreases or increases, it could have multiple concentration changes leading to a graph of the concentration that contains one or more sloped regions. The direction from the particle center to a surface of the particle is term herein the "vector radius." Thus, e.g., increasing along the vector radius means increasing from the center of the particle to a surface of the particle.

In some embodiments, the cathode active material may be expressed as $\delta Li_2MnO_3 \cdot (1-\delta)LiQO_2$ wherein Q is a mixture of Mn, Al, Ti, and Mg, and optionally with Ni, and $0 \leq \delta < 1$, where the sum of the Al, Ti, and Mg content is less than 10 mol %.

In another aspect, the cathode active material may comprise a dopant cation. Illustrative dopant cations include an alkaline earth metal element or a transition metal element other than Ni, Co and Mn, Al or combinations of any two or more thereof. Such dopant cations may be present in the particles with a constant concentration across the particle, or only within regions of the particle, or they may be present at only the surface of the particle (i.e., surface doping).

A surface protection method for electrochemical devices containing the cathode active materials described herein is provided. In such surface protection methods, the cathode active material may include a surface coating layer. Illustrative surface coating layer materials may include a conductive carbon coating, a metal oxide, a metal fluoride, a metal phosphate, or a combination of any two or more thereof. Illustrative metal oxides include, but are not limited to, $MgO$, $Al_2O_3$, $ZrO_2$, $MnO_2$, $CeO_2$, $TiO_2$, $ZnO$, $SiO_2$, $SnO_2$, $Cr_2O_3$, or a combination of any two or more thereof. Illustrate metal fluorides include, but are not limited to, $AlF_3$, $CaF_2$, $CeF_3$, $ZrF$, $ZrF_2$, $ZrF_3$, $ZrF_4$, $LaF_3$, $SrF_2$, or a combination of any two or more thereof. Illustrative metal phosphates include, but are not limited to, $Li_3PO_4$, $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, or a combination of any two or more thereof. Illustrative conductive polymers include, but are not limited to, PEDOT, a polyacetylene, a polypyrrole, a polyparaphenylene, a polythiophene, a polyfuran, a polythianaphthene, a polyaniline, their derivatives or co-polymers, or a combination of any two or more thereof.

A process for preparing the cathode active materials is also provided, where the process may be a co-precipitation reaction between metal salts in the presence of a precipitation agent in a specific solvent, followed by a first, a second, or more, calcination steps at elevated temperature, followed by a cooling step.

In the process, transition metal salt solutions with appropriate proportions of Ni, Mn, Al, and M are prepared. Then the solutions are pumped into a reactor to form a cathode active material precursor by reacting the solutions with a chelating agent and a precipitating agent. The amount of the solution or the concentration of the metals in the solution may be varied to provide for a precursor having a partial or full gradient concentration. The process may include where at least two transition metal salt solutions with different proportions of Ni, Mn, Al, and M or M' are prepared. The metal salt solution for forming a core of the cathode active material particle and the metal salt aqueous solution for forming a surface region of the cathode active material are mixed with a ratio from 100 vol %:0 vol % to 0 vol %:100 vol % with gradual change.

The metal solution may be prepared by a transition metal salt of oxalic acid, nitric acid, sulfuric acid, hydrochloric acid, or a combination of any two or more thereof, which can be dissolved in water or other solvents, without particular limitation. The concentration of M may be from 0.1 M to 10.0 M, including 0.1 M, 0.2 M, 0.3 M, 0.4 M, 0.5 M, 1.0 M, 1.5 M, 2.0 M, 2.5 M, 3.0 M, 3.5 M, 4.0 M, 4.5 M, 5.0 M, 6 M, 7 M, 8 M, 9 M, or 10 M, or any appropriate ratio within these ranges.

Meanwhile, the chelating agent may be ammonia salt or a salt containing ammonium ions such as ammonium sulfate or ammonium nitrate and a combination thereof; the concentration of chelating agent may be from 0.1 M to 10 M, including 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, or 10 M, or an appropriate ratio within this range.

The ratio of the chelating agent to the transition metal solution may also vary from 0.1 to 5, and may be 0.1, 0.2, 0.3, 0.4, 0.5, 0.6, 0.7, 0.8, 0.9, 1, 1.5, 2, 2.5, 3, 3.5, 4, 4.5, 5, or an appropriate concentration within this range.

The precipitating agent may be selected from sodium hydroxide, sodium carbonate, or sodium oxalate. The concentration of precipitating agent may be different from about 0.1 M to about 10 M. This includes about 0.5 M, 1.0 M, 1.5 M, 2.0 M, 2.5 M, 3.0 M, 3.5 M, 4.0 M, 4.5 M, 5.0 M, 6.0 M, 7.0 M, 8.0 M, 9.0 M, or 10 M, or an appropriate concentration within this range. The content of the precipitating agent in the reactor may be controlled by pH adjustment at a value from about 9 to about 12 (at room temperature). This may include about 9.0, 9.5, 10.0, 10.5, 11.0, 11.5, or 12.0, or an appropriate value within this range.

After the co-precipitation reaction, the cathode active material precursor is obtained by drying the precipitate. The cathode active material is then prepared by mixing the cathode active material precursor with a lithium and/or sodium salt, following by heat-treating (e.g. calcining).

In some embodiments, the cathode active material includes $LiNi_xMn_yAl_zM_{\alpha}O_{2-\varepsilon}B_\varepsilon$, wherein M is a combination of Ti, and Mg; B is selected from the group of F, S, Se, or Cl; $0.8 < x < 1$, $0 < y < 0.2$, $0 < z \leq 0.2$, $0 \leq \alpha \leq 0.2$, and $0 \leq \varepsilon \leq 0.1$; for use in a lithium ion battery. The cathode active material may be prepared by mixing a cathode active material precursor with a lithium salt at an appropriate ratio (i.e. based upon the range of provided stoichiometry), and heat-treating at a temperature of about 300° C. to about 1200° C. Illustrative lithium salts include, but are not limited to, lithium hydroxide, lithium carbonate, lithium nitrate, lithium chloride, lithium fluoride, lithium oxide, and the combination of any two or more thereof. A ratio of the lithium salt and the metal of the precursor may be from about 0.9 to 1.1 on a mol basis. The ratio may include about 0.9, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, or 1.10, or an appropriate stoichiometric ratio within this range. The heat-treating may include pre-sintering at a temperature of about 300° C. to about 600° C., maintaining this temperature for about 0 to about 10 hours, and then sintering at a temperature of about 680° C. to about 1200° C., and maintaining this temperature for about 5 to about 30 hours. The sintering/calcining may be conducted in an atmosphere of oxygen, air, or oxygen-enriched air.

In some embodiments, the cathode active material includes $NaNi_xMn_yAl_zM'_{\alpha}O_{2-\epsilon}B_{\epsilon'}$, wherein M' is Ti, Mg, or a combination of thereof; B is selected from the group of F, S, Se, or Cl; $0.5<x'<1$, $0<y'<0.5$, $0<z'\leq 0.2$, $0\leq\alpha'\leq 0.2$, and $0\leq\epsilon'\leq 0.1$, for use in a sodium ion battery. The cathode active material may be prepared by mixing a cathode active material precursor with a sodium salt at an appropriate ratio (i.e. based upon the range of provided stoichiometry), and heat-treating at a temperature of about 300° C. to about 1200° C. Illustrative sodium salts include, but are not limited to, sodium hydroxide, sodium carbonate, sodium nitrate, sodium chloride, sodium fluoride, sodium oxide, and the combination of any two or more thereof. A ratio of the sodium salt and the metal of the precursor may be from about 0.9 to 1.1 on a mol basis. The ratio may include about 0.9, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, or 1.10, or an appropriate stoichiometric ratio within this range. The heat-treating may include pre-sintering at a temperature of about 300° C. to about 600° C., maintaining this temperature for about 0 to about 10 hours, and then sintering at a temperature of about 680° C. to about 1200° C., and maintaining this temperature for about 5 to about 30 hours. The sintering/calcining may be conducted in an atmosphere of oxygen, air, or oxygen-enriched air.

In some embodiments, the cathode active material may be a Li- and Mn-rich cathode expressed by $\delta Li_2MnO_3\cdot(1-\delta)LiQO_2$ wherein Q is a mixture of Mn, Al, Ti, and Mg, and optionally Ni, where the sum of the Al, Ti, and Mg content is less than 10 mol % and $0<\delta<1$. A process for making such cathode active materials includes a cathode active material precursor and a lithium salt at an appropriate stoichiometric ratio (based upon the desired formula), and heat-treating at a temperature of about 300° C. to about 1200° C. The lithium salt may be selected from lithium hydroxide, lithium carbonate, lithium nitrate, lithium chloride, lithium fluoride, lithium oxide and the combination thereof; the ratio of the lithium salt and the metal of the precursor may vary from 1.0 to 1.5, including 1.00, 1.05, 1.1, 1.15, 1.2, 1.25, 1.3, 1.35, 1.4, 1.45, 1.5, and or an appropriate stoichiometric ratio within this range. The heat-treating may include pre-sintering at the temperature range of 300-600° C. maintaining 0-10 hours, and then sintering at the temperature range of 680-1200° C. maintaining 5-30 hours. The sintering atmosphere may be selected from oxygen, air and a combination thereof.

In a further aspect, a method for preparing the cathode active materials is provided, wherein the process may be a solid state reaction. The solid transition metal salts of Ni, Mn, Al, M (or M'), and lithium/sodium salt are directly mixed with appropriate ratio, then are calcined at the temperature range of about 680° C. to about 1200° C. for a time period of about 5 hours to about 30 hours. The sintering atmosphere may be selected from oxygen, air, or oxygen-enriched air. In the process, the metal salts may be selected from the corresponding metal salts of oxalic acid, nitric acid, sulfuric acid hydrochloric acid or a combination thereof, which can be decomposed in the calcination process, without particular limitation. The lithium/sodium salts may be selected from lithium/sodium hydroxide, lithium/sodium carbonate, lithium/sodium nitrate, lithium/sodium chloride, lithium/sodium fluoride, lithium/sodium oxide, and a combination of any two or more thereof, which can be decomposed in the calcination process, without particular limitation. The ratio of the lithium/sodium salt and the total metal salt may vary from 0.5 to 1.1, including 0.5, 0.6, 0.7, 0.8, 0.9, 1.00, 1.01, 1.02, 1.03, 1.04, 1.05, 1.06, 1.07, 1.08, 1.09, and 1.10, or an appropriate ratio within this range.

In some embodiments, the cathode active material expressed by $LiNi_xMn_yAl_zM_{\alpha}O_{2-\epsilon}B_{\epsilon}$ or $NaNi_xMn_yAl_zM'_{\alpha}O_{2-\epsilon}B_{\epsilon'}$ may be a single particle. The process for the single particle may be prepared by one-step or multiple steps (at least two-step). The one-step method includes mixing the precursor (synthesized by the above co-precipitant method) or solid transition metal salts of Ni, Mn, Al, and M or M', and the lithium/sodium salts in an appropriate stoichiometric ratio, and simultaneously adding appropriate amount of co-solvent. The mixture is then sintered followed by a first and a second (or more) calcination step at a temperature of about 680° C. to about 1200° C. for a time period of about 5 hours to about 30 hours, cooling of the reaction. The heating rate may be from about 0.1° C./min to about 20° C./min, and the cooling rate may be from about 0.1° C./min to about 20° C./min, or it may be natural cooling or rapid quenching. The sintering atmosphere may that of oxygen, air, or a combination thereof. The multiple step method may include preparing a single particle precursor of $Ni_xMn_yAl_zM_{\alpha}O_{2-\epsilon}B_{\epsilon}$ or $Ni_xMn_yAl_zM'_{\alpha}O_{2-\epsilon}B_{\epsilon'}$ first, mixing the single particle structure precursor with a lithium or sodium salt and an appropriate amount of co-solvent agent that is selected from LiCl, LiI, KCl, KI, CsCl, other common co-solvent salts, or a combination of any two or more thereof, and the weight ("wt") ratio of co-solvent agent and the precursor varies from 0.01 to 10. Following sintering, the material is then subjected to a first and a second (or more) calcination steps at a temperature of about 680° C. to about 1200° C. for a time period of about 5 hours to about 30 hours, and followed by a step of cooling of the reaction. During the process, the heating rate may be from about 0.1° C./min to about 20° C./min, and the cooling rate may be from about 0.1° C./min to about 20° C./min, or it may be via natural cooling or rapid quenching. The sintering atmosphere may be oxygen, air, or oxygen-enriched air. The metal salts may be selected from transition metal salts of oxalic acid, nitric acid, sulfuric acid hydrochloric acid or a combination thereof, which can be decomposed in the calcination process, without particular limitation. The lithium or sodium salt may be lithium hydroxide, sodium hydroxide, lithium carbonate, sodium carbonate, lithium nitrate, sodium nitrate, lithium chloride, sodium chloride, lithium fluoride, sodium fluoride, lithium oxide, sodium oxide, or a combination of any two or more thereof, which can be decomposed in the calcination process, without particular limitation. The ratio of the lithium or sodium salt and the total metal salt may vary from 0.5 to 1.1, including 0.5, 0.6, 0.7, 0.8, 0.9, 1.00, 1.01, 1.02, 1.03, 1.04, 1.05, 1.06, 1.07, 1.08, 1.09, 1.10, or an appropriate stoichiometric ratio within this range. The co-solvent agent may be selected from LiCl, LiI, KCl, KI, CsCl, other common co-solvent salts, or a combination of any two or more thereof, which can lower the melting temperature of the precursor transition metal salts as well as the lithium or sodium salts, and also aid in eliminating grain boundaries of small particles, without particular limitation.

Further, the present invention provides electrochemical device including the cathode active material.

In some embodiments, the electrochemical device may be lithium ion batteries. The lithium ion battery may include a cathode including the cathode active material having the above composition, an anode, and a separator between them. Further, it may include an electrolyte, in which is immersed the cathode, the anode, and the separator. The anode material may be a material which can reversibly absorb or release lithium ions, preferably, for example, a material including artificial graphite, natural graphite, graphitized carbon fiber amorphous carbon; and lithium metal may also can be used as an anode active material. The electrolyte may select from a group of liquid electrolyte containing lithium salts and non-aqueous organic solvent, polymer gel electrolyte, solid state electrolyte, ionic liquid electrolyte, aqueous electrolyte with super-concentration lithium salts and a combination thereof.

In some embodiments, the electrochemical device may be sodium ion battery. The sodium ion battery may include a cathode including the cathode active material having the above composition, an anode, and a separator between them. Further, the electrochemical device may include an electrolyte, in which is immersed the cathode, the anode, and the separator. The anode material may be a material which can reversibly absorb or release sodium ions, preferably, for example, a material including hard carbon, artificial graphite, natural graphite, graphitized carbon fiber and amorphous carbon; sodium metal also can be used as an anode active material. The electrolyte may select from a group of liquid electrolyte containing sodium salts and non-aqueous organic solvent, polymer gel electrolyte, solid state electrolyte, ionic liquid electrolyte, aqueous electrolyte with super-concentration sodium salts and a combination thereof.

The present invention, thus generally described, will be understood more readily by reference to the following examples, which are provided by way of illustration and are not intended to be limiting of the present invention.

EXAMPLES

Example 1

Electrochemical performance of $LiNi_{0.8}Co_{0.2}O_2$ versus $LiNi_{0.8}Mn_{0.2}O_2$. Two Ni-rich layered oxide cathodes with compositions of $LiNi_{0.8}Co_{0.2}O_2$ ("NC82") and $LiNi_{0.8}Mn_{0.2}O_2$ ("NM82") were synthesized by co-precipitation methods. Two samples with similar morphology and having the same Ni content but different Co and Mn content were specifically designated to simultaneously investigate the intrinsic properties of the cobalt and manganese content on Ni-rich layered oxide cathodes.

FIG. 1 is a graph of the charge/discharge voltage profiles for 50 cycles at a charge/discharge rate of C/10 of NC82 and NM82. As shown, for both NC82 and NM82 the initial specific capacity was 210 mAh g$^{-1}$ at the current rate of C/10. However, the capacity retention of the two samples diverges rapidly. After 50 cycles, the capacity loss in the NC82 is about 21%, while the loss in capacity for NM82 is only 8.1%. This indicates that the Mn is more effective than Co for stabling Ni-rich cathode active materials.

Based on the direct comparison of NC82 and NM82, Mn enables improved electrochemical performance. However, the cation mixing (Li/Ni disorder) of NM82 is believed to hinder Li diffusion in the structure frame. In addition, its electrochemical performance also needs to be continuously enhanced.

Example 2

Figure 2:
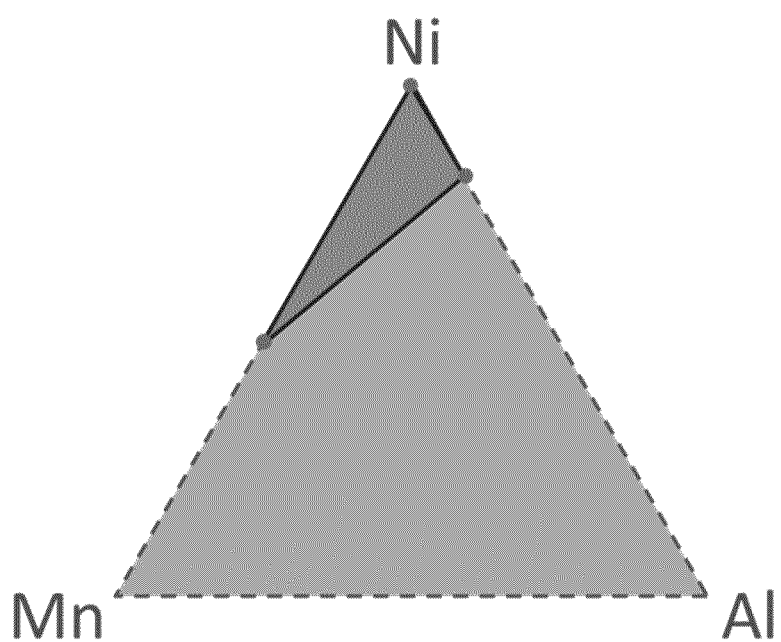
FIG. 2 is a component schematic of $LiNi_xMn_yAl_\alpha O_2$, wherein $0.5<x<1$, $0<y<0.5$, $0<\alpha\leq 0.1$.

Transition metal component schematic of three elements of Ni, Mn and Al. FIG. 2 depicts a component schematic of $LiNi_xMn_yAl_zO_2$ or $NaNi_xMn_yAl_zO_2$ mainly distributed in the shaded area at the top of the triangle, wherein $0.5<x<1$, $0<y<0.5$, $0<z\leq0.2$ and $0.5<x'<1$, $0<y'<0.5$, $0<z'\leq0.2$. The $LiNi_xMn_yAl_zO_2$ and $NaNi_xMn_yAl_zO_2$ cathode active materials may be prepared in different morphologies such a single particles, single crystals, or a secondary particle having a plurality of single particles or crystals.

In addition, the composition of $LiNi_xMn_yAl_zO_2$ may be uniform, core-shell, or part/full concentration gradient. In detail, the concentration of Ni may be constant or decreased/increased from the particle center to surface, the concentration of Mn may be constant or decreased/increased from particle center to surface; the concentration of Al is constant or decreased/increased from particle center to surface. Moreover, the gradient concentration of Ni, Mn, and Al may vary with one slope or more.

Example 3

The preparation of $LiNi_xMn_yAl_zTi_jMg_kO_2$ with full gradient concentrations. The concentration gradient cathode of $LiNi_xMn_yAl_zTi_jMg_kO_2$ is characterized that the concentration of Ni is slightly decreased from the particle center to the surface; the concentration of Mn is gradually decreased from the particle center to the surface; the concentration of Al, Mg, and Ti continuously increases from the particle center to the surface. The concentration of the Ni may decrease from 100% to 50% mol % from particle center toward surface, the concentration of the Mn may decrease from 50% to 0% mol % from particle center toward surface, the concentration of the Al may increase from 0 to 10% from particle center toward surface, and the concentrations of the Ti and Mg may increase from 0 to 10% mol % from particle center toward surface.

A $LiNi_xMn_yAl_zTi_jMg_kO_2$ cathode particle having a concentration gradient is described below. In a co-precipitation synthesis, the concentration gradient precursor was prepared by two metal solutions. The solution for preparing the core component contains Ni and Mn at a ratio of 85:15 wt % basis; and the solution for preparing the surface component contains Ni, Mn, Al, Mg, and Ti at a ratio of about 80:10:5:2.5:2.5 on a wt % basis. The concentration of two metal solutions is 2 M and prepared with sulfate salt; the volumes of two metal solutions both are 500 mL.

The initial chelating agent is prepared by mixing 1.2 L purified water and 300 ml 5 M aqueous ammonia solution, and then placing the mixture in a co-precipitation reactor. The reaction temperature was set at 60° C., the rotation speed was set at 1000 rpm, and nitrogen gas protection was applied in the whole synthesis process.

The metal aqueous solution for preparing the core and the metal aqueous solution for preparing the surface part were mixed in a total amount of 50:50 on a vol %. The metal solution for the core was directly injected into the 4 L reactor at 0.06 L/hour. At the same time, the metal solution for surface part was supplied into the metal solution for core part at the rate of 0.03 L/hour. Further, 5 M ammonia solution was continuously injected into the reactor at the rate of 0.03 L/hour. Further, the content of precipitating agent, NaOH, was controlled by pH value. 5 M NaOH aqueous solution was supplied to maintain pH in the reactor at 11. In the whole synthesis process, the stirring speed of the reactor was kept at 1000 rpm, and the reaction temperature was set at 60° C. The co-precipitation reaction was conducted around 20 hours; hereafter, the precipitant was kept at the steady state for 4 hours to obtain a co-precipitated compound with higher density. Soon afterwards, the compound was filtered, washed with water, and dried with 110° C. with nitrogen gas for 15 hours to obtain a cathode active material precursor.

The precursor was mixed with lithium hydroxide at a ratio of 1:1.03, and then heated to 450° C. at a rate of 2° C./min, and then maintain at 450° C. for 5 hours followed by calcining at 750° C. for 12 hours to obtain a final cathode active material particle.

Figure 3:
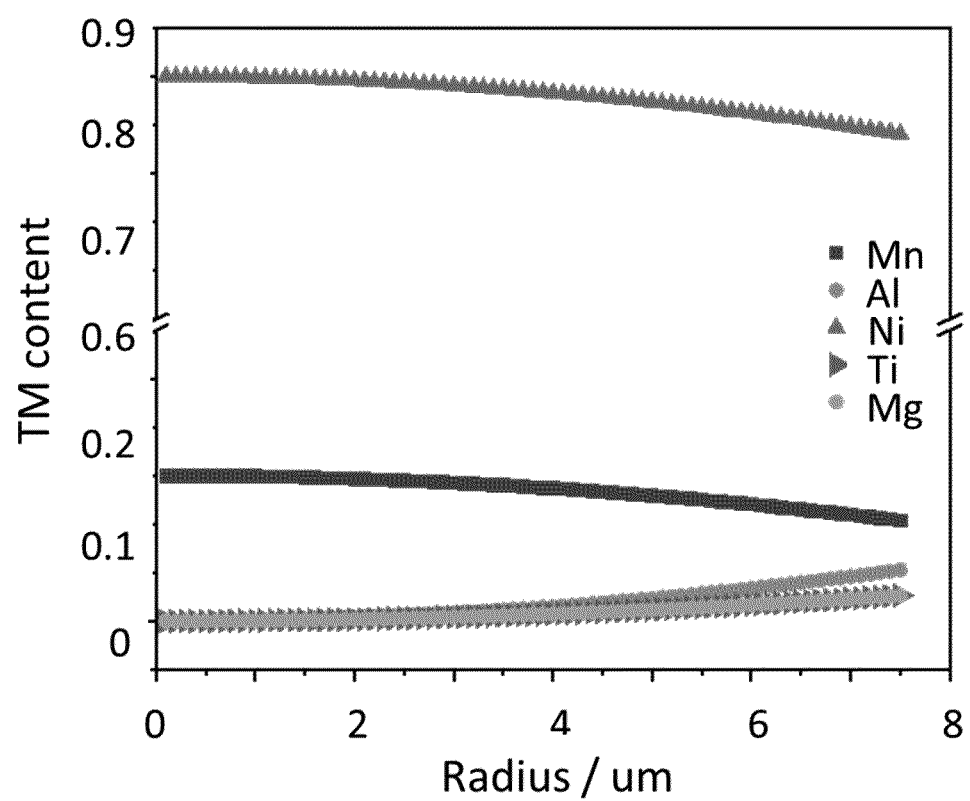
FIG. 3 illustrates a representative concentration of an idealized three-element concentration gradient cathode active materials. The Ni concentration is slightly decreased from the core to the surface, the Mn concentration is gradually decreased from the core to the surface; and the concentrations of Al, Mg, and Ti are gradually increased from the core to the surface.

According to the synthesis process, a typical representative concentration of example 3 is shown in FIG. 3. The concentration of the Ni may decreases from 85% to 80% from particle center toward surface, the concentration of the Mn decrease from 15% to 10% from particle center toward surface, the concentration of the Al increases from 0 to 5% from particle center toward surface, and the concentration of the Ti and Mg increases from 0 to 2.5% from particle center toward surface.

Example 4

The preparation of $LiNi_xMn_yAl_zTi_jMg_kO_{2-\epsilon}B_\epsilon$ gradient cathode active materials with two-slope concentration. The two-slope concentration gradient is characterized in that the concentration of Ni decreases with two slopes (different rates of concentration change) or remains constant; the concentration of Mn is gradually decreased with two slopes from the particle center to the surface; the concentration of Al, Mg, and Ti are continuously increased with two slopes from the particle center to the surface. Ni may decreases from 100% to 50% from particle center toward surface, the concentration of the Mn may decrease from 0% to 50% from particle center toward surface, the concentration of the Al may increase from 0 to 10% from particle center toward surface, and the concentration of the Ti and Mg may increase from 0 to 10% from particle center toward surface. The preparation of two-slope concentration gradient cathode is accomplished by co-precipitation and sintering process.

A typical representative of the two-slope concentration gradient cathode is described below. In a co-precipitation synthesis, the concentration gradient precursor was prepared by two metal solutions. The solution for preparing the core component contains Ni and Mn at a ratio of 80:20 on a wt % basis; and the solution for preparing the surface component contains Ni, Mn, Al, Mg and Ti at a ratio of 80:10:5:2.5:2.5 on a mol % basis; the concentration of two metal solutions is 2 M and prepared with sulfate salt; the volumes of two metal solutions are 700 ml and 300 ml, respectively.

The initial chelating agent is prepared by mixing 1.2 L purified water and 300 ml 5 M aqueous ammonia solution, and then put into a co-precipitation reactor. The reaction temperature was set at 60° C., the rotation speed was set at 1000 rpm, and nitrogen gas protection was applied in the whole synthesis process.

The metal solution for the core and the metal solution for the surface were mixed in a total amount of 70:30 on a vol % basis in total. The metal solution for the core was first injected into the reactor at a rate of 0.06 L/hour. Simultaneously, 5 M ammonia solution was injected into the reactor at a rate of 0.03 L/hour. After 9 hours of reaction, the metal solution for surface was supplied into the solution for core composition at a rate of 0.03 L/hour. A 5M ammonia solution was continuously injected into the reactor at a rate of 0.03 L/hour. Further, the content of precipitating agent, NaOH, was controlled by pH value. A 5M NaOH aqueous solution was supplied to maintain pH at 11 in the reactor. The stirring speed of the reactor was maintained at 1000 rpm, and the reaction temperature was set at 60° C. The co-precipitation reaction was conducted for about 20 hours; thereafter, the precipitant was kept at the steady state for 4 hours to obtain a co-precipitated compound with higher density. Soon afterwards, the compound was filtered, washed with water, and dried at 110° C. under a nitrogen atmosphere for 15 hours to obtain the cathode active material precursor.

The precursor was then mixed with lithium hydroxide at a ratio of 1:1.03 on a mol %, and then heated to 450° C. at a rate of 2° C./min, and then maintained at 450° C. for 5 hours followed by calcining at 750° C. for 12 hours to obtain a final cathode active material particle.

Figure 4:
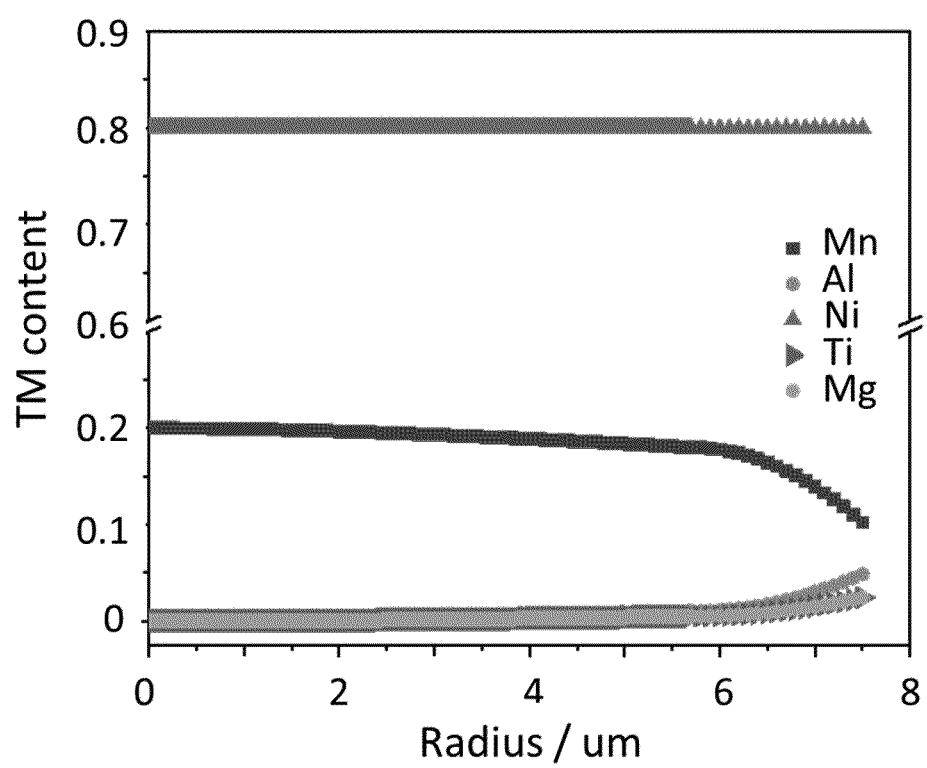
FIG. 4 is a representative concentration of an idealized two-slope concentration gradient cathode active material. The Ni concentration is constant from the core to the surface, the Mn concentration is gradually decreased with two-slopes from the core to the surface, and the concentrations of Al, Mg, and Ti are gradually increased with two-slopes from the core to the surface.

According to the synthesis process, a typical representative concentration of example 4 is shown in FIG. 4. The Ni concentration is constant at 80 mol % from the core to the surface, the Mn concentration gradually decreases from 20% to 10% mol % with two-slopes; the Al concentration gradually increases from 0 to 5% mol % with two-slopes; and the Ti and Mg concentrations gradually increase from 0 to 2.5% mol %, with two-slopes.

Example 5

The preparation of $LiNi_xMn_yAl_zO_2$ cathode active materials with different Al, Mg, and Ti content. Three $LiNi_xMn_yAl_zO_2$ cathode active materials with different Al content were prepared: ($LiNi_{0.798}Mn_{0.192}Al_{0.010}O_2$(NMA1), $LiNi_{0.776}Mn_{0.194}Al_{0.030}O_2$(NMA3) and $LiNi_{0.760}Mn_{0.190}Al_{0.050}O_2$ (NMA5)) and uniform compositions. The $LiNi_{0.76}Mn_{19}Al_{0.04}Ti_{0.005}Mg_{0.005}O_2$(NMATM) cathode active material was prepared to further explain the advantage of the combination of Al, Ti, and Mg for layered oxide cathodes.

The co-precipitant method was used to prepare four samples as described below. In a co-precipitation synthesis, the four different concentration precursors were prepared by four metal solutions with 1% Al, 3% Al, 5% Al, and 4% Al, 0.5% Mg, 0.5% Ti, on a mol %, respectively. The total transition metal concentration of the four metal solutions was 2 M and they were prepared as the sulfate salts with a total volume of 1.0 L.

The initial chelating agent was prepared by mixing 1.2 L purified water and 300 ml of 5M aqueous ammonia solution in a co-precipitation reactor. The reaction temperature was set at 60° C., the rotation speed was set at 1000 rpm, and nitrogen gas protection was applied.

The metal solutions were directly injected into the 4 L reactor at a rate of 0.06 L/hour. At the same time, 5M ammonia solution was continuously injected into the reactor at a rate of 0.03 L/hour. Further, the content of precipitating agent, NaOH, was controlled by pH value. A 4M NaOH aqueous solution was supplied to maintain a pH of 11 in the reactor. The co-precipitation reaction was conducted for about 20 hours, thereafter, the precipitant was kept at steady state for 4 hours to obtain a co-precipitated compound with higher density. Afterward, the compound was filtered, washed with water, and dried with 110° C. with nitrogen gas for 15 hours to obtain a cathode active material precursor.

The precursor was mixed with lithium hydroxide at a mol ratio of 1:1.03, and then heated to 450° C. at a rate of 2° C./min. The temperature of 450° C. was maintained for 5 hours, followed by calcining at 750° C. for 12 hours to obtain a final cathode active material particle.

Figure 5:
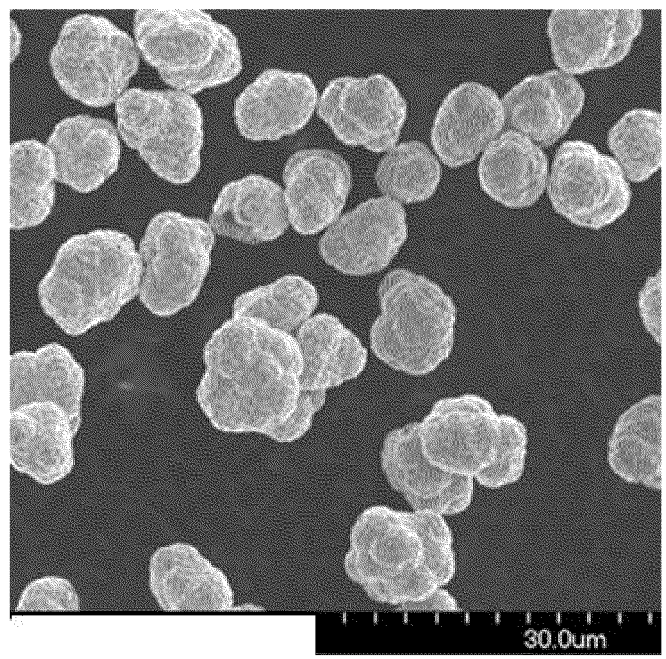
FIG. 5 is a scanning electron microscopy image of a sample NMA5 of Example 5. The image shows a generally spherical and uniform particle size with an average diameter of about 10 μm.

The scanning electron microscopy images of Example 5 are shown in FIG. 5. Example 5 (NMA5) exhibits spherical, secondary morphology. The particle sizes were estimated to be about 10 μm in diameter.

Example 6

Figure 6:
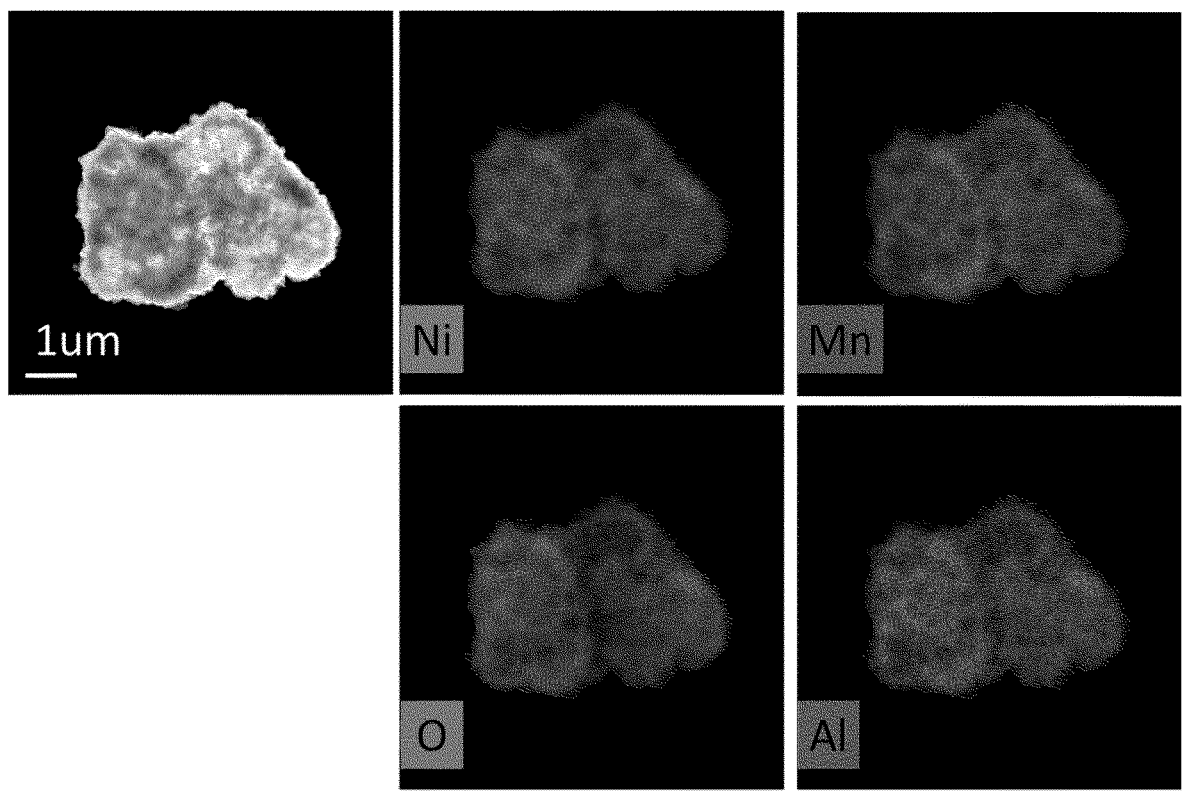
FIG. 6 depicts the morphological and composition characterization of Example 5. The composition of Example 5 was characterized by TEM with EDS mapping.

The morphological and composition characterization of Example 5. The composition of Example 5 was characterized by TEM with EDS mapping. As shown in FIG. 6, the uniform compositions of Ni, Mn, and Al have been confirmed with uniform color distributions. The quantitative analysis of Ni, Mn, and Al content shows that the composition of NMA is close to theoretical expectations.

Example 7

The structure characterization of three samples of example 5 via XRD (x-ray diffraction). High energy XRD at beamline 11 ID-C of APS at Argonne National Laboratory was employed to measure the structure properties of the samples of example 5. Below is a peak lists of three NMA materials exhibit well-ordered layer structures with R-3m space group, with clear peaks split of (006)/(102) and (108) and (110) pairs. Detailed structural information was obtained from Rietveld refinement of the XRD patterns. It is clear that axis lattice parameters of the three samples are decreased with Al, which indicates that the Al occupies the transition metal layers as opposed to the Li layers. Most interestingly, Li/Ni disorder is confirmed to decrease with Al. Li/Ni disorder of the three NMA cathodes was calculated to be approximately 5.57%, 5.01%, and 4.67%, respectively. Peaks list in the form of [hkl]/2 theta on basis of synchrotron X source ($\lambda=0.1173$): [003]/1.417; [101]/2.740; [006]/2.834; [012]/2.859; [104]/3.295; [015]/3.587; [009]/4.252; [107]/4.269; [018]/4.645; /4.675; [113]/4.885; [021]/5.419.

Example 8

Illustrative Batteries using three samples including NMA1, NMA3, NMA5 of Example 5. For electrochemical testing, the three samples of Example 5 were mixed with carbon black and PVDF (polyvinylidenedifluoride) at 80:10:10 wt % ratios and ground in a mortar. The well-mixed slurry was then cast onto a sheet of aluminum foil by a doctor blade on an automatic film coater. The film was dried in a vacuum oven at 80° C. for 12 hours and then transferred to a glove box filled with argon, before being punched out as circular, 14 mm in diameter, disks. The 2032 type coin cells were used to prepare lithium half cells. Celgard 2325 separators and 1.2 M $LiPF_6$ in EC/EMC (3:7) electrolyte (GEN II) were used.

Figure 7A:
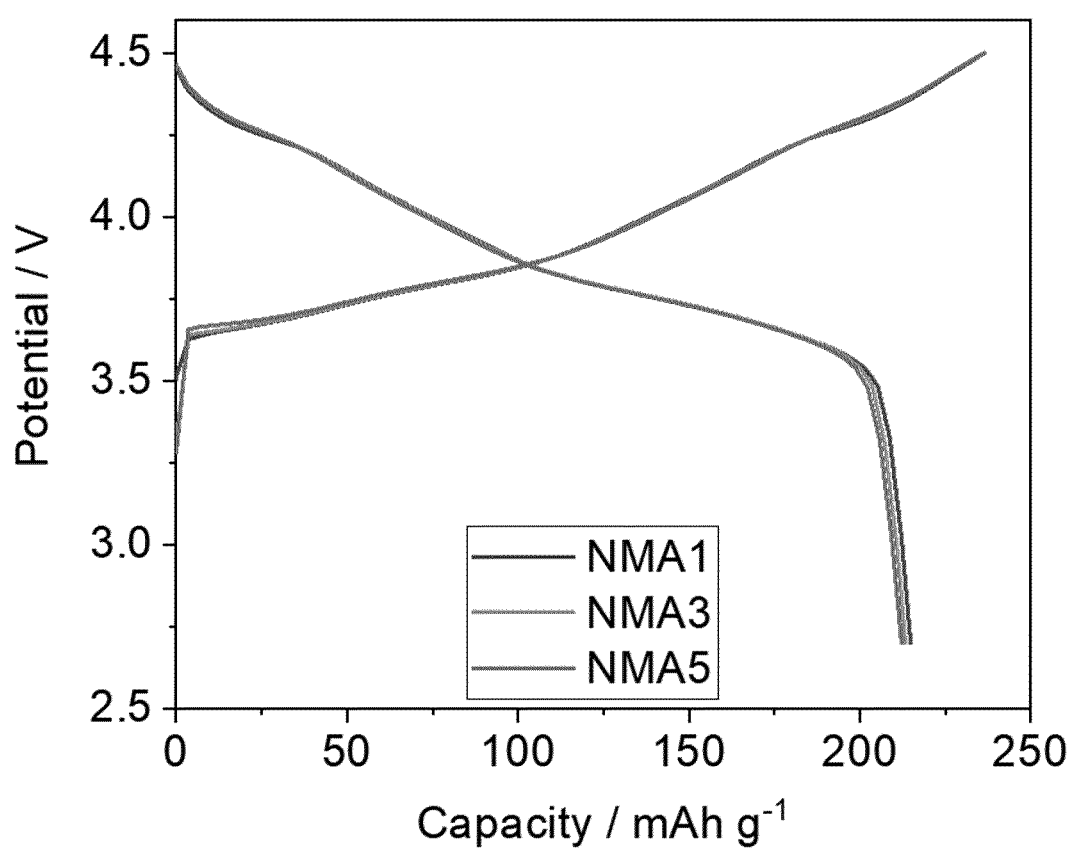
FIG. 7A includes graphs of the charge/discharge and dQ/dV curves for $LiNi_{0.798}Mn_{0.192}Al_{0.01002}$ (NMA1), $LiNi_{0.776}Mn_{0.194}Al_{0.030}O_2$ (NMA3), and $LiNi_{0.760}Mn_{0.190}Al_{0.050}O_2$ (NMA5) at a cut-off potential of 4.5V.
Figure 7B:
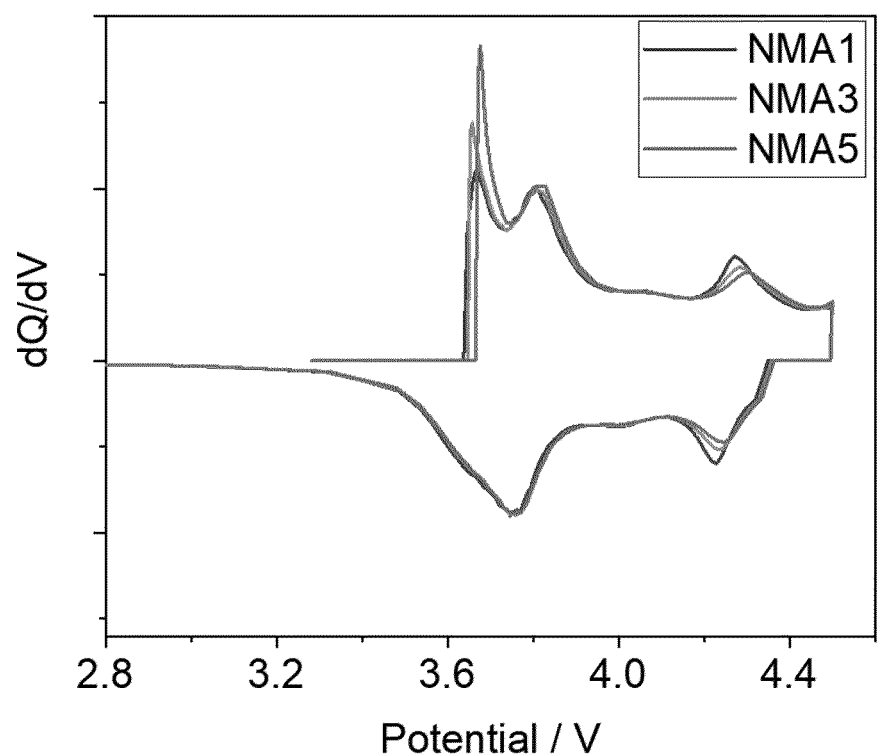
FIG. 7B is the corresponding dQ/dV curves for the three samples.

FIG. 7A illustrates that the three cathodes deliver a high discharge capacity of 214 mAh $g^{-1}$, 213 mAh $g^{-1}$ and 212 mAh $g^{-1}$ at a cut-off potential of 4.5 V, respectively. Interestingly, the phase transition behaviors of three NMA cathodes exhibits an obvious change with Al. FIG. 7B illustrates that the partially irreversible phase transitions from H2-H3, which has been considered as the origin of capacity degradation, are significantly suppressed with Al content.

Example 9

Figure 8:
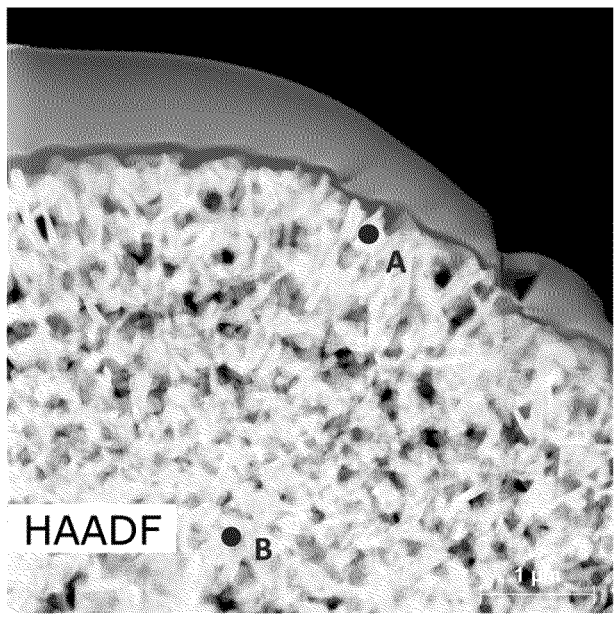
FIG. 8 depicts the morphological and composition characterization of NMATM. The composition of NMATM was characterized by TEM with EDS mapping. The uniform compositions of Ni, Mn, and Al have been confirmed with different point scan; Mg and Ti mainly appear on the particle surface based on TEM EDS results.

The morphological and composition characterization of NMATM of Example 5. The NMATM composition of Example 5 was characterized by TEM with EDS mapping. As shown in FIG. 8, the uniform compositions of Ni, Mn, and Al have been confirmed with different point scan; Mg and Ti mainly appear on the particle surface based on TEM EDS results. The quantitative analysis of Ni, Mn, Al, Mg, and Ti contents shows that the composition of NMATM is close to theoretical expectations.

Example 10

Figure 9:
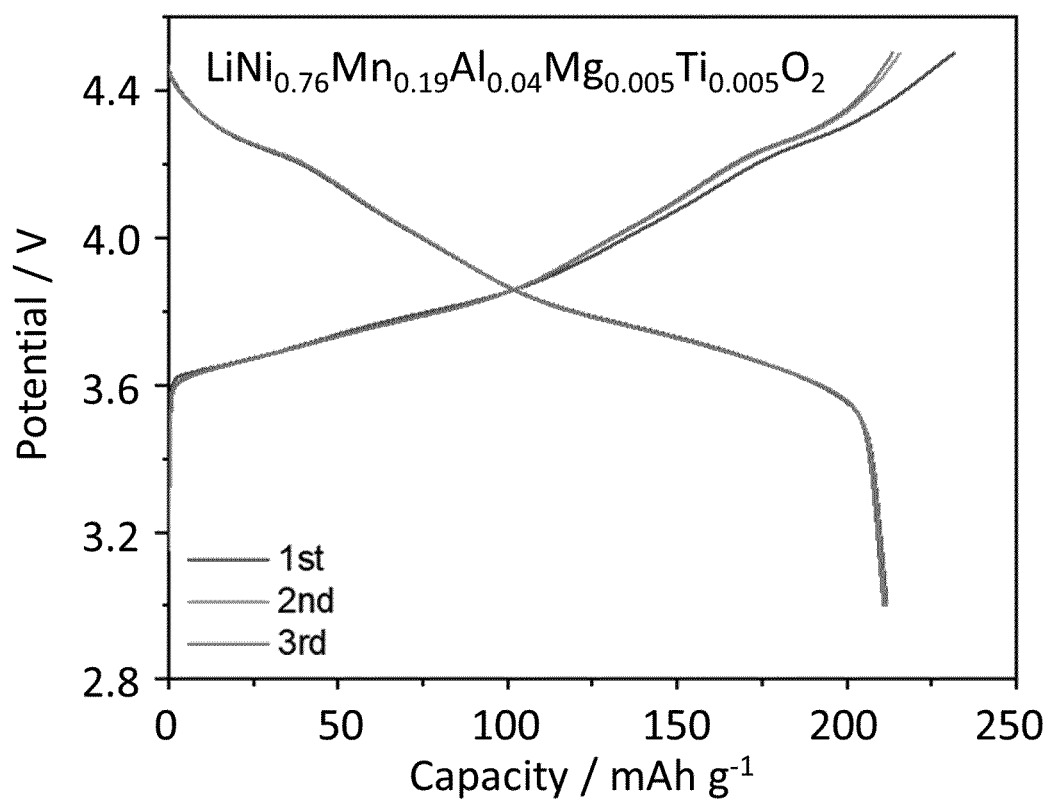
FIG. 9 is the charge/discharge curves of $LiNi_{0.760}Mn_{0.190}Al_{0.04}Mg_{0.0005}Ti_{0.005}O_2$ at a cut-off potential of 4.5 V.

Illustrative Batteries using a sample NMATM of Example 5. For electrochemical testing, the three samples of Example 5 were mixed with carbon black and PVDF at 80:10:10 wt % ratios and ground in a mortar. The well-mixed slurry was then cast onto a sheet of aluminum foil by a doctor blade on an automatic film coater. The film was dried in a vacuum oven at 80° C. for 12 h and then transferred to a glove box filled with argon, before being punched out as circular, 14 mm in diameter, disks. The 2032 type coin cells were used to prepare lithium half cells. Celgard 2325 separators and 1.2 M $LiPF_6$ in EC/EMC (3:7) electrolyte (GEN II) were used. FIG. 9 the cell of NMATM delivered an improved discharge capacity around 213.8 mAh $g^{-1}$, compared with NMA5.

Example 11

Figure 10:
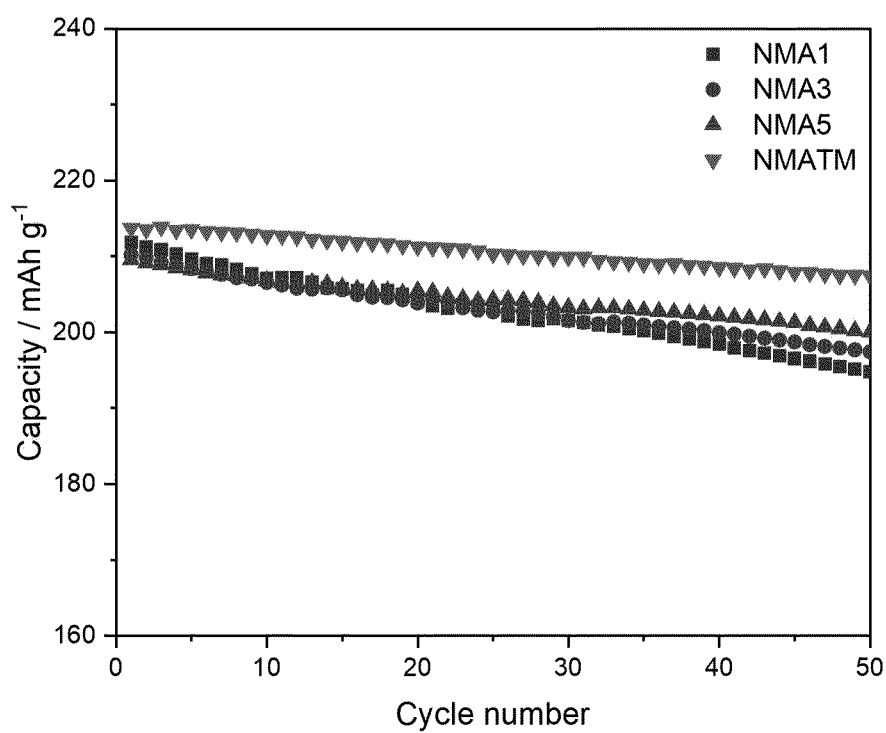
FIG. 10 depicts the cycle performance of three the NMA cathodes and $LiNi_{0.760}Mn_{0.190}Al_{0.04}Mg_{0.005}Ti_{0.005}O_2$ at a cut-off potential of 4.5 V.

The cycle stability at high voltage of the cells for NMA1, NMA3, NMA5 and NMATM. FIG. 10 depicts the capacity retention of the three NMA cathodes and NMATM cathode after 50 cycles are 92.2%, 93.8%, 95.6% and 97.1% at a high potential of 4.5 V, respectively, wherein the capacity retentions of three NMA cathodes exhibits an increasing trend with Al and much better than that of NCA. In addition, NMATM with Al, Ti and Mg dopants shows further increase in battery cycle life.

Various Embodiments

Para. 1. A cathode active material of formula $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8 < x < 1$, $0 < y < 0.2$, $0 < z \leq 0.2$, $0 \leq \alpha \leq 0.2$, $0 \leq \varepsilon \leq 0.1$, $0.5 < x' < 1$, $0 < y' < 0.5$, $0 < z' \leq 0.2$, $0 \leq \alpha' \leq 0.2$, and $0 \leq \varepsilon' \leq 0.1$.

Para. 2. The cathode active material of Para. 1 having the formula $LiNi_xMn_yAl_zTi_jMg_kO_{2-\varepsilon}B_\varepsilon$, wherein $0 < z \leq 0.1$, $0 < j \leq 0.05$, and $0 < k \leq 0.05$, and wherein the sum of z, j, and k is $\leq 0.2$. Or, the cathode active material of Para. 1 having the formula $LiNi_xMn_yAl_{z'}Ti_{j'}Mg_{k'}O_{2-\varepsilon}B_\varepsilon$, wherein $0 < z' \leq 0.06$, $0 < j' \leq 0.01$, and $0 < k' \leq 0.01$, and wherein the sum of z', j', and k' is $\leq 0.1$ Para. 4. The cathode active material of Para. 1 or 3 having the formula $NaNi_{x'}Mn_{y'}Al_{z'}M'_{\alpha'}O_{2-\varepsilon'}B_{\varepsilon'}$, wherein M' is Ti, Mg, or a combination thereof; $0 \leq \alpha' \leq 0.2$, and wherein the sum of z' and α' is $\leq 0.1$.

Para. 5. The cathode active material of any one of Paras. 1-4 which is free of cobalt.

Para. 6. A particle of cathode active material of formula $LiNi_xMn_yAl_zM_\alpha O_{2-\varepsilon}B_\varepsilon$ or $NaNi_xMn_yAl_zM'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq0.2$, $0\leq\alpha\leq0.2$, $0\leq\varepsilon\leq0.1$, $0.5<x'<1$, $0<y'<0.5$, $0<z'\leq0.2$, $0\leq\alpha'\leq0.2$, and $0\leq\varepsilon'\leq0.1$; wherein the particle is a single crystal, a single particle, or a secondary particle comprising a plurality of primary particles.

Para. 7. The particle of Para. 6 having the formula $NaNi_xMn_yAl_zM'_{\alpha'}O_{2-\varepsilon'}B_{\varepsilon'}$, wherein M' is Ti, Mg, or a combination thereof; $0\leq\alpha'\leq0.1$, and wherein the sum of z' and α' is ≤0.2.

Para. 8. The particle of Para. 6 or 7, wherein the particle is generally spherical and wherein a single crystal or a single particle has a diameter of about 10 nm to about 5 μm.

Para. 9. The particle of Para. 8, wherein the secondary particle is generally spherical and the plurality primary particles comprise single crystals or single particles, and the secondary particle has a diameter of from about 1 about 30 μm.

Para. 10. The particle of Para. 6, 7, 8, or 9, wherein the particle has a vector radius defined from a center of the particle to a surface of the particle, wherein a concentration of the Ni is constant or decreases along the vector radius; a concentration of the Mn is constant, decreases, or increases along the vector radius; a concentration of the Al is constant, decreases, or increases along the vector radius; and a concentration of M is constant, decreases, or increases along the vector radius.

Para. 11. The particle of Para. 10, wherein the increasing or decreasing concentration of Ni, Mn, Al, and/or M or M' is a step-wise concentration change or a gradient concentration change.

Para. 12. The particle of Para. 10 or 11, wherein the increasing or decreasing concentration of Ni, Mn, Al, and/or M or M' may include regions of different rates of concentration change along the vector radius.

Para. 13. The particle of any one of Paras. 6-12 further comprising a surface coating.

Para. 14. The particle of Para. 13, wherein the surface coating comprises a metal oxide, a metal fluoride, a metal phosphate, a conductive carbon coating, or a combination of any two or more thereof.

Para. 15. The particle of Para. 14, wherein the surface coating comprises a metal oxide comprising MgO, $Al_2O_3$, $ZrO_2$, $MnO_2$, $CeO_2$, $TiO_2$, ZnO, $SiO_2$, $SnO_2$, $Cr_2O_3$, or a combination of any two or more thereof.

Para. 16. The particle of Para. 14, wherein the surface coating comprises a metal fluoride comprising $AlF_3$, $CaF_2$, $CeF_3$, ZrF, $ZrF_2$, $ZrF_3$, $ZrF_4$, $LaF_3$, $SrF_2$, or a combination of any two or more thereof.

Para. 17. The particle of Para. 14, wherein the surface coating comprises a metal phosphate comprising $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, or a combination of any two or more thereof.

Para. 18. The particle of Para. 14, wherein the surface coating comprises PEDOT (poly(3,4-ethylenedioxythiophene), polyacetylenes, polypyrroles, polyparaphenylenes, polythiophene, polyfurans, polythianaphthenes, polyanilines, a derivative thereof, a copolymer thereof, or a combination of any two or more thereof.

Para. 19. The particle of any one of Paras. 6-18 which is free of cobalt.

Para. 20. The particle of any one of Paras. 6-19, further comprising a dopant metal that is an alkaline earth metal element or a transition metal element other than Ni, Co and Mn and Al, or a combination of any two or more thereof.

Para. 21. The particle of Para. 20, wherein the cathode active material is of formula $LiNi_xMn_yAl_zM_\alpha M''O_{2-\varepsilon}B_\varepsilon$ or $NaNi_xMn_yAl_zM'_{\alpha'}M''O_{2-\varepsilon'}B_{\varepsilon'}$, wherein M is a combination of Ti, and Mg; M' is Ti, Mg, or a combination thereof, and M" is the dopant metal. In such embodiments, the dopant may be present at low concentration.

Para. 22. The particle of Para. 20, wherein the particle has a vector radius defined from a center of the particle to a surface of the particle, wherein a concentration of the Ni is constant or decreases along the vector radius; a concentration of the Mn is constant, decreases, or increases along the vector radius; a concentration of the Al is constant, decreases, or increases along the vector radius; a concentration of M is constant, decreases, or increases along the vector radius; and a concentration of M is either constant along the vector radius, or M is only present in a region proximal to the surface of the particle.

Para. 23. A cathode active material of formula:

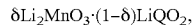

$\delta Li_2MnO_3\cdot(1-\delta)LiQO_2$, wherein:

Q is a mixture of Mn, Al, Ti, and Mg, and optionally Ni; and the total amount of Al, Ti, and Mg is less than 10 mol %; and $0<\delta<1$.

Para. 24. A process of preparing a cathode active material, the process comprising: providing a first aqueous solution of salts of Ni, Mn, Al, and M or M'; combining the aqueous solutions with a chelating agent and a precipitating agent to form a precipitate; mixing the precipitate with a lithium or sodium salt to form a mixture; and heating-treating the mixture to form the cathode active material; wherein M is a combination of Ti, and Mg, and M' is Al, Ti, Mg, or a combination of any two or more thereof.

Para. 25. The process of Para. 24, wherein the combining includes varying the concentrations of the salts of Ni, Mn, Al, and M or M' such that a concentration gradient of the Ni, Mn, Al, and/or M or M' is established in particles of the precipitate along a vector radius defined from a center of the particle to a surface.

Para. 26. The process of Para. 25, wherein the concentration of the Ni is constant or decreasing along the vector radius.

Para. 27. The process of Para. 25, wherein the concentration of the Mn is constant, decreasing, or increasing along the vector radius, or where regions of the vector radius contain constant, decreasing, or increasing concentrations of Mn.

Para. 28. The process of Para. 25, wherein the concentration of the Al is constant, decreasing, or increasing along the vector radius, or where regions of the vector radius contain constant, decreasing, or increasing concentrations of Al.

Para. 29. The process of Para. 25, wherein the concentration of the M or M' is constant, decreasing, or increasing along the vector radius, or where regions of the vector radius contain constant, decreasing, or increasing concentrations of M or M'.

Para. 30. The process of Para. 25, wherein the providing includes, preparing a first solution having a first ratio of Ni:Mn:Al:M (or M'), preparing a second solution having a second ratio of Ni:Mn:Al:M (or M'); and the combining comprises mixing the first solution with the second solution in a ratio 100 vol %:0 vol % such that a core portion of the precipitate is formed from the salts at the first ratio, and during further mixing the ratio of the first solution to the second solution is adjusted to 0 vol %:100 vol % such that an outer surface of the precipitate is formed from the salts of at the second ratio.

Para. 31. The process of Para. 30, wherein the precipitate exhibits a concentration of Ni that is constant or decreased along the vector radius; a concentration of Mn that is constant, decreased, or increased along the vector radius; a concentration of Al that is constant, decreased, or increased along the vector radius; and the concentration of M or M' is constant, decreased, or increased along the vector radius.

Para. 32. The process of any one of Paras. 24-30, wherein the salts are sulfates, sulfites, chlorates, nitrates, acetates, phosphates, citrates, carbonates, or a mixture of any two or more thereof.

Para. 32. The process of any one of Paras. 24-31, wherein the chelating agent comprises an ammonium salt.

Para. 33. The process of Para. 32, wherein the ammonium salt is an ammonium sulfate or an ammonium nitrate.

Para. 34. The process of any one of Paras. 24-33, wherein a concentration of chelating agent is from about 0.1 M to about 10 M.

Para. 35. The process of any one of Paras. 24-34, wherein a ratio of the chelating agent the total of the Ni, Mn, Al, and/or M or M', on a mol basis is from 0.1 to 5.

Para. 36. The process of any one of Paras. 24-35, wherein the precipitating agent is sodium hydroxide, sodium carbonate, sodium oxalate, or a combination of any two or more thereof.

Para. 37. The process of any one of Paras. 24-36, wherein a concentration of precipitating agent is from about 0.1 M to about 10 M.

Para. 38. The process of any one of Paras. 24-37, wherein a ratio of the chelating agent the total of the Ni, Mn, Al, and/or M or M', on a mol basis is from 0.1 to 5.

Para. 39. The process of any one of Paras. 24-38, wherein a concentration of the precipitating agent is controlled by changing the pH of the solution in a range from 9 to 12.

Para. 40. The process of any one of Paras. 24-39, wherein: the heat-treating comprises at least one calcination step at a heating rate to a temperature of about 680° C. to about 1200° C.; and the calcination step is conducted in an oxygen atmosphere, an air atmosphere, or in an oxygen-enriched air atmosphere.

Para. 41. The process of any one of Paras. 24-40, wherein the lithium salt is lithium hydroxide, lithium carbonate, lithium oxalate, lithium nitrate, or a mixture of any two or more thereof; and wherein a ratio of the lithium to precipitate is 1.0 to 1.1 on a mol basis.

Para. 42. The process of any one of Paras. 24-40, wherein the sodium salt is sodium hydroxide, sodium carbonate, sodium oxalate, sodium nitrate, or a mixture of any two or more thereof; and wherein a ratio of the sodium to precipitate is about 0.5 to about 1.1 on a mol basis.

Para. 43. A process of preparing a cathode active material, the process comprising: mixing in the solid state, salts of Ni, Mn, Al, and M or M' with a lithium and/or sodium salt to form a mixture; and calcining the mixture at a temperature from about 680° C. to about 1200° C. for a time period of about 5 to about 30 hours in an oxygen atmosphere, air atmosphere, or oxygen enriched air atmosphere to form the cathode active material; wherein M is a combination of Ti, and Mg, and M' is Ti, Mg, or a combination of any two or more thereof.

Para. 44. The process of Para. 43, wherein: the calcining comprises heating at a heating rate to a temperature of about 680° C. to about 1200° C. for about 5 to about 30 hours, followed cooling at a cooling rate; the heating rate is from about 0.1° C./min to about 20° C./min; the cooling rate is natural cooling, rapid quench cooling, or at a rate from about 0.1° C./min to about 20° C./min quenching; and the calcination step is conducted in an oxygen atmosphere, an air atmosphere, or in an oxygen-enriched air atmosphere.

Para. 45. The process Para. 43 or 44, wherein the heat treating comprises adding a co-solvent agent to form a single particle of the cathode active material, and where the cathode active material is of formula $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq 0.2$, $0\leq\alpha\leq 0.2$, $0\leq\varepsilon<0.1$, $0.5<x'<1$, $0<y'<0.5$, $0<z'\leq 0.2$, $0\leq\alpha'\leq 0.2$, and $0\leq\varepsilon'\leq 0.1$.

Para. 46. The process Para. 45, wherein the co-solvent agent may be selected from LiCl, LiI, KCl, KI, CsCl, other common co-solvent salts, or a combination of any two or more thereof.

Para. 47. An electrochemical device comprising an anode, a non-aqueous electrolyte, and a cathode; the cathode comprising a cathode active material of formula $LiNi_xMn_yAl_zM_\alpha O_{2-\varepsilon}B_\varepsilon$ or $NaNi_{x'}Mn_{y'}Al_{z'}M'_{\alpha'}O_{2-\varepsilon'}B_{\varepsilon'}$, wherein M is a combination of Ti, and Mg; M' is Ti, Mg, or a combination of thereof; B is selected from the group of F, S, Se, or Cl; $0.8<x<1$, $0<y<0.2$, $0<z\leq 0.2$, $0\leq\alpha\leq 0.2$, $0\leq\varepsilon\leq 0.1$, $0.5<x'<1$, $0<y'<0.5$, $0<z'\leq 0.2$, $0\leq\alpha'\leq 0.2$, and $0\leq\varepsilon'\leq 0.1$.

Para. 48. The electrochemical device of Para. 46, wherein the electrochemical device is a lithium ion battery or sodium ion battery.

Para. 49. The particle of Para. 6, 7, 8, or 9, wherein the particle has a vector radius defined from a center of the particle to a surface of the particle, wherein a concentration of the Ni is constant or decreases along the vector radius; a concentration of the Mn is constant, decreases, or increases along the vector radius; a concentration of Al is constant along the vector radius, and the Ti and Mg increase along the vector radius.

Para. 50. The particle of Para. 6, 7, 8, or 9, wherein the particle has a vector radius defined from a center of the particle to a surface of the particle, wherein a concentration of the Ni is constant or decreases along the vector radius; a concentration of the Mn is constant, decreases, or increases along the vector radius; a concentration of Al is constant along the vector radius, and the Ti and Mg are only present in the outer 10% of the vector radius.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode active material of formula $LiNi_xMn_yAl_zM_\alpha O_{2-\varepsilon}B_\varepsilon$ or $NaNi_xMn_yAl_{z'}M'_{\alpha'}O_{2-\varepsilon'}B_{\varepsilon'}$;
   wherein:
   M is a combination of Ti and Mg;
   M' is Ti, Mg, or a combination thereof;
   B is F, S, Se, or Cl; and
   $0<z\leq0.2$, $0.8<x<1$, $0<y<0.2$, $0\leq\alpha\leq0.2$, and $0<\varepsilon\leq0.1$
   $0<z'\leq0.2$, $0.5<x'<1$, $0<y'<0.5$, $0\leq\alpha'\leq0.2$, and $0<\varepsilon'\leq0.1$; and
   the active material is a single crystal.

2. The cathode active material of claim 1 having the formula $LiNi_xMn_yAl_zTi_jMg_kO_{2-\varepsilon}B_\varepsilon$, wherein $0<z\leq0.1$, $0<j\leq0.05$, and $0<k\leq0.05$, and the sum of z, j, and k is $\leq0.1$.

3. The cathode active material of claim 1 having the formula $NaNi_xMn_yAl_{z'}M'_{\alpha'}O_{2-\varepsilon'}B_{\varepsilon'}$, wherein M' is Ti, Mg, or a combination thereof; and wherein the sum of z' and α' is <0.2.

4. A process of preparing the cathode active material of claim 1, the process comprising:
   providing start aqueous solution of Ni, Mn, Al, and M or M' salts;
   combining the aqueous solutions with a chelating agent and a precipitating agent to form a precipitate;
   mixing the precipitate with a lithium or sodium salt to form a mixture; and
   heating-treating the mixture to form the cathode active material;
   wherein M is a mixture of Ti, and Mg, and M' is Ti, Mg, or a combination thereof.

5. The process of claim 4, wherein at least two start solutions include varying the concentrations of the salt of Ni, Mn, Al, and M or M' such that a concentration gradient of the Ni, Mn, Al, and/or M or M' is established in particles of the precipitate along a vector radius defined from a center of the particle to a surface.

6. The process of claim 5, wherein:
   the heat-treating comprises at least one calcination step at a heating rate to a temperature of about 680° C. to about 1200° C.
   the calcination step is conducted in an oxygen atmosphere, an air atmosphere, or in an oxygen-enriched air atmosphere.

7. A particle of cathode active material of formula $LiNi_xMn_yAl_zM_\alpha O_{2-\varepsilon}B_\varepsilon$ or $NaNi_xMn_yAl_{z'}M'_{\alpha'}O_{2-\varepsilon'}B_{\varepsilon'}$;
   wherein:
   M is a combination of Ti and Mg;
   M' is Ti, Mg, or a combination thereof;
   B is F, S, Se, or Cl;
   $0<z\leq0.2$, $0.5<x<1$, $0<y<0.5$, $0\leq\alpha\leq0.2$, and $0<\varepsilon\leq0.1$
   $0<z'\leq0.2$, $0.5<x'<1$, $0<y'<0.5$, $0\leq\alpha'\leq0.2$, and $0<\varepsilon'\leq0.1$;
   the particle is a single crystal.

8. The particle of cathode active material of claim 7 having the formula $LiNi_xMn_yAl_zTi_jMg_kO_{2-\varepsilon}B_\varepsilon$, wherein $0<z\leq0.1$, $0<j\leq0.05$, $0<k\leq0.05$, and wherein the sum of z, j, and k is $\leq0.2$.

9. The particle of cathode active material of claim 7 having the formula $NaNi_xMn_yAl_zM'_{\alpha'}O_{2-\varepsilon'}B_{\varepsilon'}$, wherein M' is Ti, Mg, or a combination thereof and wherein the sum of z and α' is $\leq0.1$.

10. The particle of cathode active material of claim 7, wherein the particle is generally spherical and has a diameter of about 10 nm to about 10 μm.

11. The particle of claim 7 further comprising a dopant cation.

12. The particle of claim 11, wherein the dopant cation includes an alkaline earth metal element or a transition metal element other than Ni, Co, Mn, and Al or combinations of any two or more thereof.

13. The particle of claim 7 further comprising a surface coating.

14. The particle of claim 13, wherein the surface coating comprises a metal oxide, a metal fluoride, a metal phosphate, a conductive carbon coating, or a combination of any two or more thereof.

* * * * *